Feb. 14, 1961   J. A. MILLER   2,971,385
FOUR SPEED AUTOMATIC TRUCK TRANSMISSION
Filed April 7, 1954
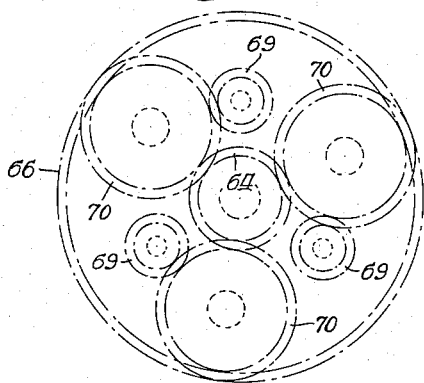
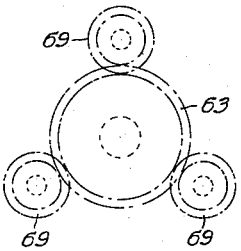
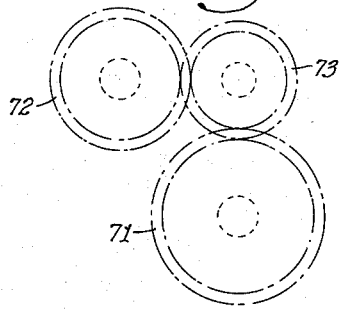
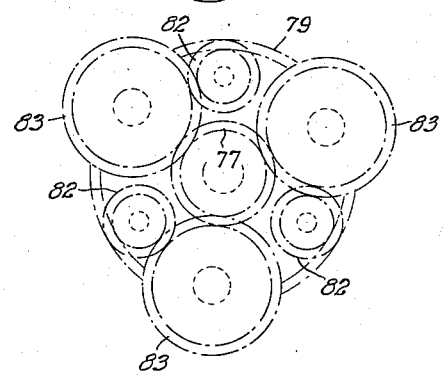
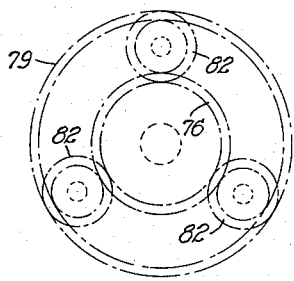
Inventor:
James A. Miller

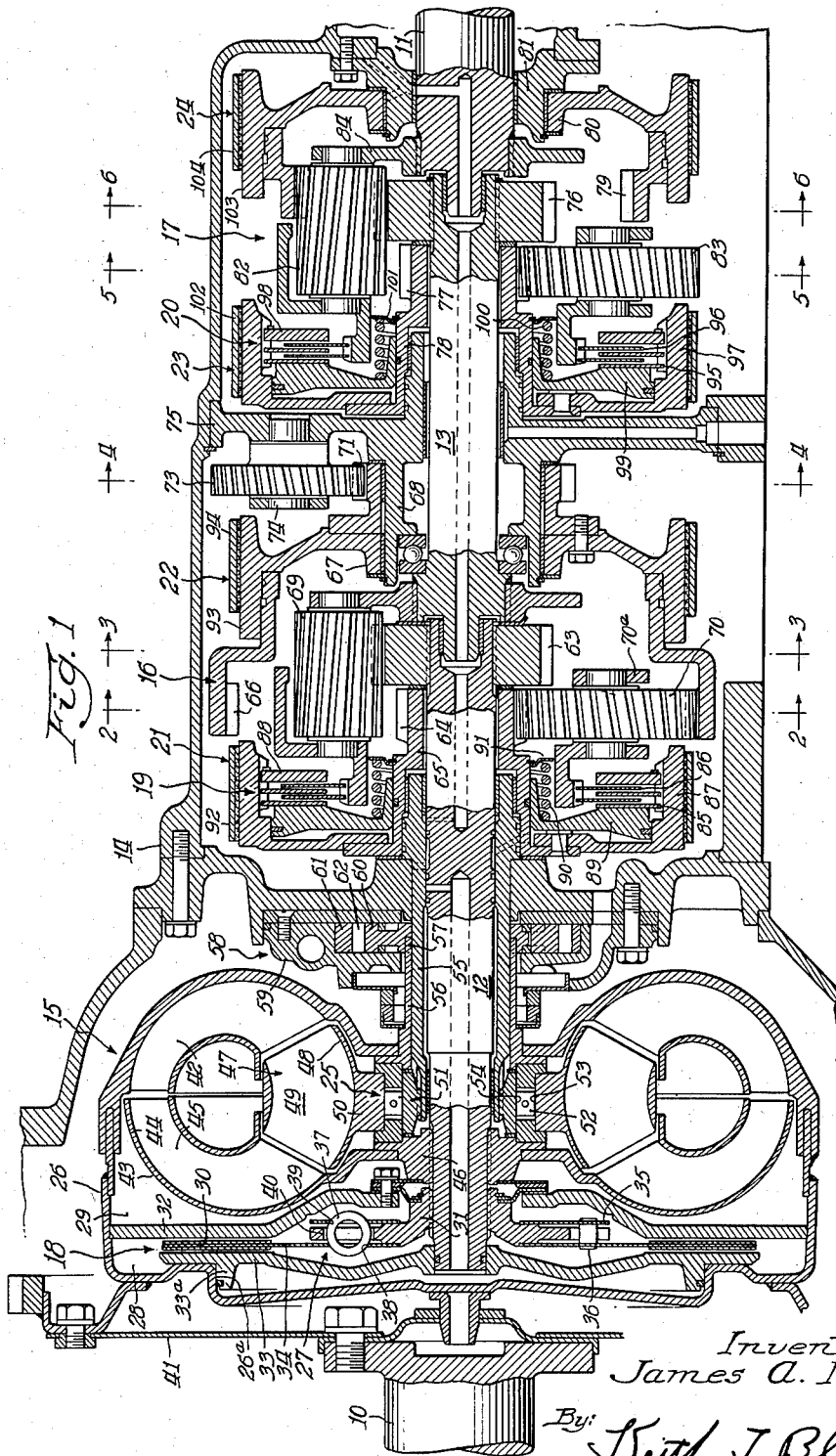

United States Patent Office 2,971,385
Patented Feb. 14, 1961

2,971,385

FOUR SPEED AUTOMATIC TRUCK TRANSMISSION

James A. Miller, Jackson, Mich., assignor to Borg-Warner Corporation, Chicago, Ill., a corporation of Illinois Filed Apr. 7, 1954, Ser. No. 421,665

6 Claims. (Cl. 74—15.86)

My invention relates to transmissions and more particularly to transmissions suitable for a truck-type of vehicle.

It is an object of the invention to provide an improved transmission having four speeds in forward drive and one speed in reverse drive, all speeds being completed by engagement of friction engaging mechanisms, so that changing between the various ratios may be accomplished without interruption of torque from the driving engine of the vehicle.

It is another object of the invention to so arrange the transmission that only two friction clutches and four friction brakes of the band variety are required for completing four different speed ratios in forward drive and one speed ratio in reverse drive.

It is also an object to provide such a transmission comprising two planetary gear sets, with the transmission being advantageously compact for ready installation in a truck-type vehicle.

It is an additional object to provide such a transmission with a hydraulic torque converter connected in tandem with the planetary gearing, with the latter being capable of providing four different speed ratios in forward and one speed ratio in reverse. It is contemplated that the planetary gearing shall preferably include two planetary gear sets in tandem.

It is an object of my invention to provide a transmission having four speed ratios in forward drive that differ from each other by substantially equal steps.

Another important object of my invention is to provide a transmission that is so arranged that the forward speed drives may be so changed sequentially from one ratio to another, that for each change from low to second, thence from second to third and finally from third to fourth, only one friction device need be disengaged while a single friction device is engaged.

A specific object of the invention is to provide a power take-off gear for driving an instrumentality on a vehicle either when the vehicle is stationary or when the vehicle is in motion.

The invention consists of the novel constructions, arrangements and devices to be hereinafter described and claimed for carrying out the above-stated objects and such other objects as will appear from the following description of a preferred embodiment, illustrated with reference to the accompanying drawings wherein:

Fig. 1 is a longitudinal sectional view of a transmission embodying the principles of the invention; and Figs. 2, 3, 4, 5 and 6 are sectional views taken respectively on lines 2—2, 3—3, 4—4, 5—5 and 6—6 of Fig. 1 in the directions indicated.

Like characters of reference designate like parts in the several views.

Referring to the drawings, the illustrated transmission, which is one particularly suitable for use in a truck, comprises in general, a drive shaft 10, a driven shaft 11, a first intermediate shaft 12 and a second intermediate shaft 13. The shaft 10 is adapted to be connected to the engine of the vehicle in which the transmission is installed, and the shaft 11 is adapted to be connected to the driving wheels of the vehicle by means of any suitable mechanism (not shown). The shaft 11 is piloted in the shaft 13 which is piloted in the shaft 12, and all of these shafts are coaxially disposed. The transmission is housed in a casing 14 and also comprises a hydraulic torque converter 15, planetary gear sets 16 and 17, friction clutches 18, 19 and 20 and friction brakes 21, 22, 23 and 24, and a one-way brake 25.

The intermediate shaft 12 can be driven from the drive shaft 10 through the friction clutch 18. The torque converter 15 comprises a converter casing 26, and the clutch 18 is disposed in the casing. The friction clutch 18 comprises a vibration dampener 27, and the casing 26 is divided in two compartments 28 and 29, one enclosing the clutch 18 and its vibration dampener unit 27, and the other enclosing parts of the torque converter 15. The clutch 18 comprises a clutch disc 30 connected by means of the vibration dampener unit 27 with a hub 31 which is splined on to the shaft 12. The clutch disc 30 is adapted to be clamped between a pressure plate 32, which is the divider between the two compartments 28 and 29, and is disposed in and fixed with respect to the torque converter casing 26, and a piston 33. The piston is disposed in the casing 26 and is provided with a cylindrical portion 33a that is slidably disposed in a cylindrical cavity 26a which is provided in the casing 26. Fluid pressure may be supplied to the cavity 26a and on the piston 33 through any suitable passages to cause the clutch plate 30 to be frictionally engaged between the pressure plate 30 and the piston 33.

The vibration dampener unit 27 is of a usual construction and comprises a circular plate 34 that constitutes part of the clutch disc 30 and a second circular plate 35. The plates 34 and 35 are disposed on opposite sides of the annular hub 31, and are held in position with respect to each other by rivets 36. Also encased between the plates 34 and 35 are a plurality of springs 37 which are disposed in windows 38 and 39 of the plates 34 and 35 and in windows 40 of the hub 31.

The hydraulic torque converter casing 26 is connected by metal straps 41 with the drive shaft 10. The liquid for the torque converter is encased by the casing 26 in the compartment 29. The torque converter 15 comprises a fluid impeller having blades 42 formed integrally within the casing 26. A driven rotor 43 is disposed in the compartment 29 and comprises a shell 44 with rotor blades 45 disposed therein. The rotor 43 is fixed on a hub 46 which is splined to the shaft 12. A stator 47 is also disposed in the casing 26 between the blades 42 and 45 and comprises an outer shell 48 having stator blades 49 fixed thereto. The stator 47 is fixed with respect to a race member 50 which is rotatably disposed with respect to a stationary race member 51.

The one-way brake 25 is of an ordinary type and comprises the outer and inner race members 50 and 51, and a plurality of tiltable sprags 52 disposed between and in contact with the race members 50 and 51. The outer race member 50 has a cylindrical surface 53, and the inner race member 51 has a cylindrical surface 54 and is splined to an annular sleeve portion 55 which is fixed to the transmission casing 14. The one-way brake 25 is so constructed as to allow free rotation of the stator 47 in the forward direction, that is, in the same direction of rotation as the shaft 10 is driven, but prevents reverse rotation of the stator 47 due to the wedging action of the sprags 52 between the cylindrical surfaces 53 and 54 that locks the races together.

The torque converter 15 functions in accordance with well-known principles of operation to cause a drive of the rotor 43 of the hydraulic unit at an increased torque with respect to the torque impressed on the drive shaft 10 at relatively low speeds of the rotor 43. At low rotor speeds, the stator 47 is stationary due to the one-way brake 25 and takes a reaction from the fluid within the torque converter 15 in the reverse direction. As the rotor 43 gains in speed, the fluid reaction on the stator 47 changes direction, and the stator 47 being released by the one-way brake, rotates along with the drive shaft 10 and the impeller blades 42 as well as with the rotor 43. Whenever it is desired to drive the shaft 12 directly from the shaft 10 exclusive of the converter 15, the clutch 18 is engaged by compressing the clutch disc 30 between the piston 33 and the pressure plate 32, fluid pressure being applied from any suitable source to the piston 33 for this operation.

The torque converter casing 26 is provided with a tubular extension 56 having tabs or fingers 57 on its end. A pump 58 is driven by the extension 56 and comprises a housing 59 which is fixed with respect to the external casing 14 of the transmission. Eccentrically arranged inner and outer gears 60 and 61 are disposed in the housing 59 with the inner gear being rotatably driven within the outer gear by tabs 57. The housing 59 is also provided with a segmental casing portion 62 that is located between the gears 60 and 61. Pumping action is obtained by fluid being carried by the gears across the segmental casing portion. The pump 58 may be utilized to provide fluid pressure for engaging the friction clutches 18, 19 and 20 and the friction brakes 21, 22, 23 and 24 and to provide lubrication for the entire transmission and any necessary cooling oil for the friction brakes and clutches.

The planetry gear set 16 comprises a sun gear 63 splined to the first intermediate shaft 12; a sun gear 64 rotatably disposed on shaft 12 and integrally formed with a sleeve portion 65 that is rotatably supported on the fixed sleeve portion 55; a ring gear 66 that is connected to a sleeve portion 67 which is rotatably supported on a fixed sleeve portion 68; elongated planet gears 69 (one being shown in Fig. 1) in mesh with the sun gear 63; planet gears 70 (one being shown in Fig. 1) which are in mesh with the sun gear 64, the ring gear 66, and the elongated planet gears 69; and a planet gear carrier 70a that rotatably supports the planet gears 69 and 70 and is connected to both the friction clutch 19 and the second intermediate shaft 13. The sun gear 64 is connected through the sleeve portion 65 to the friction clutch 19 and the friction brake 21, and the ring gear 66 is connected to the friction brake 22.

A gear 71 connected to the ring gear 66 by means of the sleeve portion 67 is located between the two planetary gear sets 16 and 17. The gear 71 is connected to a slidably movable power take-off gear 72 (see Figure 4) through a spur or idler gear 73 that is rotatably supported on a fixed stub shaft 74. The stub shaft 74 is carried by a casing portion 75 which is fixed within the casing 14 and on which is formed the sleeve portion 68 that in addition to rotatably supporting the sleeve portion 67 also serves to journal the shaft 13 as shown.

The planetary gear set 17 comprises a sun gear 76 splined to the second intermediate shaft 13, a sun gear 77 rotatably supported on shaft 13 and integrally formed with a sleeve portion 78 that is rotatably supported on the fixed sleeve portion 68 and a ring gear 79 connected to a sleeve portion 80 that is rotatably supported on an annular journal portion 81 of the transmission casing 14. The planetary gear set 17 also comprises elongated planet gears 82 (one being shown in Fig. 1), in mesh with the sun gear 76 and the ring gear 79, planet gears 83 (one being shown in Fig. 1) which are in mesh with the sun gear 77 and the elongated planet gears 82. A planet gear carrier 84 rotatably supports the planet gears 82 and 83 and is connected to both the friction clutch 20 and the driven shaft 11. The sun gear 77 is connected through the sleeve portion 78 to the friction clutch 20 and to the friction brake 23, and the ring gear 79 is connected to the friction brake 24.

The friction clutch 19 comprises clutch plates 85 and 86 which are splined to a brake drum 87 and the planet gear carrier 70a, respectively. The brake drum 87 is connected to the sleeve portion 65, as shown. The plates 85 extend inwardly from the brake drum 87 and are interleaved with the plates 86 between a backing plate 88 splined to the brake drum 87 and an annular piston 89 which is disposed and movable in an annular cavity provided in the brake drum 87, so that upon application of fluid pressure to the piston 89, through suitable passages the clutch plates 85 and 86 are frictionally engaged. Upon engagement of clutch 19, the sun gear 64 and the planet gear carrier 73 will be drivingly connected. A spring 90 is disposed between the piston 89 and a spring retainer 91 fixed with respect to the sleeve portion 65. The spring 90 acts on the piston 89 to return the piston to clutch disengaging position.

The friction brake 21 is provided for the sun gear 64 and comprises the brake drum 87 that is connected with the sleeve portion 65 and a brake band 92 adapted to grip the drum 87. The friction brake 22 is provided for the ring gear 66 and comprises a brake drum 93 that is connected with the ring gear 66 and a brake band 94 that is adapted to grip the brake drum 93. The brake drum 93 is also integrally formed with the sleeve portion 67 that is connected to the gear 71, as shown.

The friction clutch 20 comprises clutch plates 95 and 96 which are splined to a brake drum 97 and the planet gear carrier 84, respectively. The brake drum 97 is connected to the sleeve portion 78, as shown. The plates 95 extend inwardly from the brake drum 97 and are interleaved with the plates 96 between a backing plate 98 splined to the brake drum 97 and an annular piston 99 which is disposed and movable in an annular cavity provided in the brake drum 97, so that upon application of fluid to the piston 99 through suitable passages, the clutch plates 95 and 96 are frictionally engaged. Upon engagement of clutch 20, the sun gear 77 and the planet gear carrier 84 will be drivingly connected. A spring 100 is disposed between the piston 99 and a spring retainer 101 secured to the sleeve portion 78, and acts on the piston 99 to return the piston to clutch disengaging position.

The friction brake 23 is provided for the sun gear 77 and comprises the brake drum 97 that is connected to the sleeve portion 78, and a brake band 102 adapted to grip the drum 97. The friction brake 24 is provided for the ring gear 79 and comprises a brake drum 103, that is connected with the ring gear 79 and integrally formed with the sleeve portion 80, and a brake band 104 adapted to grip the brake drum 103.

In the operation of the illustrated transmission, which may advantageously be utilized in a truck-type vehicle since the transmission is particularly adapted for heavy duty use, there are provided four speed ratios in forward drive and one speed ratio in reverse.

The transmission is conditioned for low speed or first speed forward drive by applying the friction brakes 21 and 24 which are effective to hold the sun gear 64 and the ring gear 79 stationary. As a result, the drive is completed for the first forward ratio speed from the drive shaft 10, and through the torque converter 15, the first intermediate shaft 12, the sun gear 63, the planet gears 69, the planet gears 70, the planet gear carrier 70a, the second intermediate shaft 13, the sun gear 76, the planet gear 82 and the planet gear carrier 84 to the driven shaft 11. The reaction of the planetary gearing 16 is taken by the brake 21 functioning through the sun gear 64, the planet gears 70 and the planet gear carrier 70a; and the reaction of the planetary gearing 17 is taken by the brake 24 functioning through the ring gear 79, the planet gears 82 and the planet gear carrier 84. With the brakes 21 and 24 engaged, the planetary gear sets 16 and 17 both transmit drive at reduced speed but increased torque. The two gear sets 16 and 17 are in effect connected in tandem so that the over-all torque multiplication of the gear sets is the product of the torque multiplication of the two gear sets. For starting the vehicle, the torque converter 15 also multiplies torque, and the converter 15 is connected in tandem with the first planetary gear set 16 so that the torque multiplication through the whole transmission is the product of the multiplications produced by the two gear sets 16 and 17 and the converter 15.

The drive in second speed forward ratio is subsequently obtained by disengaging friction brake 24 while engaging the friction brake 23 and allowing friction brake 21 to remain engaged. The second speed power train is the same as the first speed power train except that the drive through the second planetary gear set 17 is changed. The reaction in this case, instead of being taken by the ring gear 79 is now taken by the sun gear 77 and the result is that the drive through the second planetary gear set 17 is increased in speed but decreased in torque multiplication, the speed ratio in the gearing 17 still, however, remaining at less than one to one. The friction brake 23, instead of the friction brake 24, takes the reaction of the gear set 17 in second speed ratio.

The drive in third speed forward ratio is obtained by engaging the friction clutch 19 while disengaging the friction brake 21 and allowing friction brake 23 to remain engaged. Engagement of clutch 19 is obtained by applying fluid under pressure to the piston 89, thereby frictionally engaging the clutch plates or discs 85 and 86 with each other between the backing plate 88 and piston 89. The third speed power train is through the torque converter 15, as for the first and second speed ratios, and the drive from thence is through the intermediate shaft 12, the sun gear 63, the planet gears 69 and 70, the sun gear 64, the clutch 19, the planet gear carrier 70a, the second intermediate shaft 13, the sun gear 76, the planet gears 82 and 83, the planet gear carrier 84 to the driven shaft 11. The various parts of the planetary gearing 16 in third speed forward ratio are locked up by the clutch 19 so that they all rotate at the speed of the shaft 12 and cross the shaft 13 to be driven at a one to one drive with respect to the shaft 12, and the reaction of the planetary gearing 17 is taken by the brake 23 as previously described in the second speed ratio.

The drive in fourth speed forward ratio is obtained by disengaging the friction brake 23 and engaging the friction clutch 20 and allowing the friction clutch 19 to remain in engagement. The drive is from the torque converter 15 through the first intermediate shaft 12, the sun gear 63, the planet gears 69 and 70, the sun gear 64, the clutch 19, the planet gear carrier 70a, the second intermediate shaft 13, the sun gear 76, the planet gears 82 and 83, the sun gear 77, the clutch 20, the planet gear carrier 84 to the driven shaft 11. The clutch 19 locks up the parts of the planetary gear set 16 as in third speed forward ratio, and the clutch 20 locks up the parts of the planetary gear set 17 so that they all rotate as a unit to provide in effect a direct drive between the shafts 12 and 11.

It is ordinarily desired to utilize the torque conversion produced by the torque converter 15 for starting the vehicle in low speed forward drive; however, in order to obtain greater efficiencies, the clutch 18 may be engaged in low speed drive as well as in any of the other speed drives to transmit the power from the drive shaft 10 directly to the intermediate shaft 12 exclusive of the torque converter 15. The clutch 18 is engaged by simply applying fluid under pressure to the piston 33 to grip the clutch plate 30 between the backing plate 32 and the piston 33.

In order to obtain reverse drive, the friction brakes 22 and 24 are engaged. As a result, the drive proceeds from the torque converter 15, through the first intermediate shaft 12, the sun gear 63, the planet gears 69 and 70, the planet gear carrier 70a, the second intermediate shaft 13, the sun gear 76, the planet gears 82, the planet gear carrier 84 to the driven shaft 10. The reaction of the planetary gear set 16 is taken by the friction brake 22 holding the ring gear 66 stationary, and the reaction of the planetary gear set 17 is taken by the friction brake 24 functioning to hold the ring gear 79 stationary. The friction brake 22 which is effective on the ring gear 66 functions to cause the planetary gear set 16 to reverse the direction of drive and the intermediate shaft 13 is driven from the gear set 16 in the reverse direction but at an increased torque and at a decreased speed with respect to the shaft 12. The planetary gear set 17 functions as in low speed forward drive to drive the driven shaft 11 at a reduced speed in the same direction and at increased torque with respect to the shaft 13. In reverse drive, the torque multiplication through the entire transmission, as in the forward speed drives, is the product of the torque multiplications produced by the two planetary gear sets 16 and 17 and the hydraulic torque converter 15. The torque converter 15, once the vehicle has been started can be bypassed if desired, by engaging the friction clutch 18.

| | Clutch 19 | Clutch 20 | Brake 21 | Brake 22 | Brake 23 | Brake 24 | Ratios | Percent Steps |
|---|---|---|---|---|---|---|---|---|
| R | | | | X | | X | 5.2462 | |
| 1 | | | X | | | X | 5.2462 | 81.0 |
| 2 | | | X | | X | | 2.8992 | 70.3 |
| 3 | X | | | | X | | 1.7027 | 70.3 |
| 4 | X | X | | | | | 1.000 | |

The power take-off gear unit comprising the gears 71, 73 and 72 may be utilized for driving any selected instrumentality on the vehicle whether or not the vehicle is actually being driven through the transmission. A power train is completed from the drive shaft 10 to the gear 72 through the hydraulic torque converter 15 or the friction clutch 18 in parallel with the torque converter 15, and the gear set 16. Either the brake 21 or the clutch 19 may be engaged to complete the power train through the gearing 16, the drive being from the intermediate shaft 12 and through the sun gear 63, the planet gears 69, planet gears 70, the ring gear 66, the gear 71, the spur gear 73 to the power take-off gear 72. In the event it is desired that the gear 72 be inactive when the vehicle is being driven in any of the forward speed ratios, it is simply necessary to axially move the gear 72 out of mesh with the drive 73.

My improved transmission advantageously includes a pair of planetary gear sets 16 and 17, which are connected in tandem with each other and are capable of providing four different speed ratios in forward drive and one speed ratio in reverse. In addition, a hydraulic torque converter 15 is connected in tandem with the two planetary gear sets 16 and 17 for still further multiplying the torque available through the transmission as a unit. No positive engaging devices are utilized, and the power trains are all completed by friction engaging devices, so that the transmission may be changed from one speed ratio to another without any interruption of torque of the driving engine. This is accomplished by means of two friction clutches and four friction brakes of the band type.

An additional important advantage is that the four forward speed ratios are so arranged as to differ from each other by substantially equal steps. Note the percentage steps shown in the chart above for one particular embodiment of the invention in which the percentage steps are respectively 70.3%, 70.3% and 81%. Another important advantage is that the transmission is so arranged that the forward speed drives may be so changed sequentially that for each change from low to second, thence from second to third and finally from third to fourth, only one friction device, a clutch or brake, need be engaged while a single other friction device is disengaged to complete the change.

The power take-off gear 72 advantageously may be driven through the gearing 16 and torque converter 15 or clutch 18 either when the driven shaft 11 is effectively disconnected from the shaft 13 due to the friction device of the gearing 17 being disengaged or when the drive is completed from the shaft 13 to the shaft 11 by engagement of one of the friction devices for the gearing 17. Thus the driven instrumentality on the vehicle operated by the power take-off gear 72 may be driven either when the vehicle is stationary or when the vehicle is in motion.

I wish it to be understood that my invention is not to be limited to the specific constructions and arrangements shown and described except only insofar as the claims may be so limited as it will be understood to those skilled in the art that changes may be made without departing from the principles of the invention.

I claim:

1. In a transmission, the combination of a drive shaft, a driven shaft, a planetary gear set having an input element connected with said drive shaft and an output element connected to the driven shaft and first and second reaction elements, a power take-off gear connected to one of said reaction elements, clutch means for locking one of said reaction elements with said output element and brake means for each of said reaction elements, said clutch means and said brake means each being engageable individually in order to complete two different speed ratios in forward drive and one speed ratio in reverse drive from said drive shaft to said driven shaft, said power take-off gear being driven from said drive shaft without driving the driven shaft.

2. In a transmission; the combination of a drive shaft; a driven shaft; a planetary gear set having a sun gear connected to and driven by said drive shaft, a ring gear, a second sun gear, a first planet gear and a second planet gear, said planet gears being in mesh with each other, said first planet gear being also in mesh with said first sun gear, said second planet gear being also in mesh with said second sun gear and said ring gear and a planet gear carrier rotatably supporting the planet gears, said planet gear carrier being connected to the driven shaft; a gear connected with said ring gear and constituting a power take-off gear; a selectively engageable clutch means for locking together the second sun gear and the planet gear carrier and selectively engageable brake means for both the second sun gear and the ring gear; said clutch means and said brake means being engageable individually in order to complete three different ratio power trains from said drive shaft to said driven shaft; said power take-off gear being driven from said drive shaft without driving the driven shaft.

3. In a transmission, the combination of a drive shaft, a driven shaft, a first planetary gear set connected to be driven by said drive shaft, a second planetary gear set connected to be driven by said first planetary gear set and to drive said driven shaft, brake means for selectively completing various power trains through each of said planetary gear sets, and a power take-off connected to one of the elements of said first planetary gear set so that the power take-off can be driven from said drive shaft without driving said driven shaft.

4. In a transmission, the combination of a drive shaft, a driven shaft, a first planetary gear set connected to be driven by said drive shaft, a second planetary gear set connected to be driven by said first planetary gear set and to drive said driven shaft, reaction elements in each planetary gear set, friction brakes for each of said reaction elements and for selectively completing various power trains through each of said planetary gear sets and a power take-off gear driven by one of the reaction elements of the first planetary gear set so that said power take-off gear can be driven from the drive shaft without driving the driven shaft.

5. In a transmission; the combination of a drive shaft; a driven shaft; a first and a second planetary gear set connected in tandem; said first planetary gear set having an input element connected with said drive shaft, an output element, two reaction elements and a power take-off gear connected to one of said reaction elements; said second planetary gear set having an input element connected with said first planetary gear set, an output element connected to the driven shaft and two reaction elements; clutch means for locking together one of the two reaction elements in each planetary gear set with the respective output element and brake means for each of said reaction elements in the first and second planetary gear sets; individual ones of said clutch and brake means of said first planetary gear set being engageable simultaneously with individual ones of said clutch and brake means of said second planetary gear set in order to complete four different speed ratios in forward drive and one speed ratio in reverse drive from said drive shaft to said driven shaft, and said power take-off gear being selectively drivable with or without driving said driven shaft.

6. In a transmission; the combination of a drive shaft; a driven shaft; a first and a second planetary gear set connected in tandem; said first planetary gear set having a sun gear connected with said drive shaft, two reaction elements including a second sun gear and a ring gear, a power take-off gear connected to said ring gear and a planet gear carrier connected to the second planetary gear set; said second planetary gear set having an input element connected with said first planetary gear set, an output element connected to the driven shaft and two reaction elements; selectively engageable friction clutches for locking together one of the two reaction elements in each planetary gear set with the respective output element and selectively engageable friction brakes for each of said reaction elements in the two planetary gear sets; individual ones of said friction clutches and said friction brakes of said first planetary gear sets being engageable simultaneously with individual ones of said friction clutch and said friction brakes of said second planetary gear set in order to complete four different speed ratios in forward drive and one speed ratio in reverse drive from said drive shaft to said driven shaft with the power flowing through both gear sets for all speed ratios.

References Cited in the file of this patent

UNITED STATES PATENTS

| Number | Name | Date |
|---|---|---|
| 723,758 | Symmonds | Mar. 24, 1903 |
| 1,307,230 | Von Zweigbergk | June 17, 1919 |
| 2,306,902 | Rabe | Dec. 29, 1942 |
| 2,354,257 | Greenlee | July 25, 1944 |
| 2,466,320 | Lawrence | Apr. 5, 1949 |
| 2,591,342 | Dodge | Apr. 1, 1952 |
| 2,618,979 | Benning | Nov. 25, 1952 |
| 2,672,763 | Limon et al. | Mar. 23, 1954 |
| 2,826,098 | Holdeman | Mar. 11, 1958 |

FOREIGN PATENTS

| Number | Country | Date |
|---|---|---|
| 993,137 | France | July 18, 1951 |
| 1,019,966 | France | Nov. 12, 1952 |